(12) United States Patent
Blonde et al.

(10) Patent No.: US 7,847,989 B2
(45) Date of Patent: Dec. 7, 2010

(54) METHOD FOR CONVERSION OF A COLOUR SPACE USING SEPARATE CHROMATIC AND LUMINANCE LOOK-UP TABLES

(75) Inventors: Laurent Blonde, Thorigne Fouillard (FR); Jürgen Stauder, Montreuil sur Ille (FR); Julien Thollot, Betton (FR)

(73) Assignee: Thomson Licensing, Boulogne Billancourt (FR)

( * ) Notice: Subject to any disclaimer, the term of this patent is extended or adjusted under 35 U.S.C. 154(b) by 310 days.

(21) Appl. No.: 11/901,615

(22) Filed: Sep. 17, 2007

(65) Prior Publication Data

US 2008/0074717 A1 Mar. 27, 2008

(30) Foreign Application Priority Data

Sep. 21, 2006 (FR) .................................. 06 53883

(51) Int. Cl.
*G03F 3/08* (2006.01)
(52) U.S. Cl. ..................... 358/518; 358/1.9; 358/520; 382/162; 382/167; 345/590; 345/597; 345/600
(58) Field of Classification Search ................. None
See application file for complete search history.

(56) References Cited

U.S. PATENT DOCUMENTS

| | | | | |
|---|---|---|---|---|
| 5,060,060 A | * | 10/1991 | Udagawa et al. | ............ 358/520 |
| 5,280,344 A | * | 1/1994 | Witlin et al. | ................ 348/708 |
| 5,614,925 A | * | 3/1997 | Braudaway et al. | ......... 345/593 |
| 5,991,511 A | | 11/1999 | Granger | |
| 6,335,800 B1 | * | 1/2002 | Balasubramanian | ........ 358/1.9 |
| 6,847,376 B2 | * | 1/2005 | Engeldrum et al. | ......... 345/600 |
| 2003/0053682 A1 | * | 3/2003 | Haikin et al. | ............... 382/162 |
| 2007/0081720 A1 | * | 4/2007 | Ok et al. | ..................... 382/162 |

FOREIGN PATENT DOCUMENTS

| EP | 0 700 198 A2 | 3/1996 |
|---|---|---|
| EP | 0 778 546 A2 | 6/1997 |
| EP | 1 011 263 A2 | 6/2000 |

OTHER PUBLICATIONS

Search Report Dated Feb. 21, 2007.

\* cited by examiner

*Primary Examiner*—Mark K Zimmerman
*Assistant Examiner*—Miya J Cato
(74) *Attorney, Agent, or Firm*—Robert D. Shedd; Harvey D. Fried; James McKenzie

(57) ABSTRACT

According to the method,
starting from the chromatic components $x_S$, $y_S$ of the color vector to be converted, the components of an intermediate color vector $R_{INT-CR}$, $G_{INT-CR}$, $\Sigma_{INT-CR}$ are-interpolated, whose chromatic components, expressed in the source color space are: $x_{INT-CR}=x_S$, $y_{INT-CR}=y_S$;
starting from the luminance component $S_S$ of the color vector to be converted and from the luminance component $\Sigma_{INT-CR}$ of the intermediate color vector, the luminance component $\Sigma_D$ of the converted color vector is interpolated;
the chromatic components $R_D$, $G_D$ of the converted color vector are calculated from its luminance component $\Sigma_D$ and from the components of the intermediate color vector $R_{INT-CR}$, $G_{INT-CR}$, $\Sigma_{INT-CR}$. The conversion methods of the prior art are substantially improved.

4 Claims, 3 Drawing Sheets

METHOD FOR CONVERSION OF A COLOUR SPACE USING SEPARATE CHROMATIC AND LUMINANCE LOOK-UP TABLES

This application claims the benefit, under 35 U.S.C. §119, of French Patent Application No. 0653883 filed Sep. 21, 2006.

BACKGROUND OF THE INVENTION

1. Field of the Invention

The invention relates to a method for converting colours from one colour space, known as source colour space, into a colour space referred to as destination colour space.

2. Description of the Prior Art

Such a method may notably be used for the display of images by means of a device such as a plasma display screen or LCD (liquid crystal display) screen. Starting from source signals that express colour vectors in a source colorimetric space, independent of any device, such as for example a standard CIE space XYZ, or xyY, it is required that these colour vectors be expressed in a colour space particular to the display device, or destination space, and that the destination signals, capable of driving this device for displaying these colours, be thus obtained. For conventional display devices using three primary colours (red, green, blue), such a colour space particular to the device is generally denoted RGB and the components of each colour correspond to the control signal for each primary colour. This method is used in an analogous manner for printing an image, notably by means of a printer or film, and the three primary colours then generally correspond to cyan, magenta and yellow, the destination space then being denoted CMY; the space CMYK, where K denotes black, is preferably used.

Such a method may be used in reverse for capturing images by means of a device, such as for example a camera or a scanner. Starting from source signals delivered by the camera that express colour vectors in a colour space particular to the imaging device, or source space, generally denoted RGB, it is required that these colour vectors be expressed in a destination calorimetric space independent of any device, such as for example a standard CIE space XYZ, or xyY, and that signals capable, for example, of the transmission, storage and/or processing of the captured images be thus obtained.

In order to carry out such a conversion from one colour space-to another, a look-up table between certain colour vectors of the source space and certain colour vectors of the destination space is generally used; this table is generally obtained by a series of calorimetric measurements. This table may be seen as modelling the behaviour of the display or image capture device. To each row of this table, there corresponds a colour vector in the source colour space and in the destination colour space, and an end point of this vector which will be used as a node for the mesh of one and/or of the other space; each row of this table therefore contains the values of the components of the colour vector expressed in the source space and the values of the components of the same colour vector expressed in the destination space. By connecting the 'nodes' corresponding to the various-rows of this table, a mesh of one and/or of the other space is obtained, in such a manner that a mesh may be associated with any given colour vector of one or other space, to which mesh the end of this vector belongs.

In order to perform such a conversion from one colour space to another, interpolation means are generally then used whose general .principle is as follows: given a source colour vector to be converted, identified by the values of its components expressed in the source space, the mesh of the source space to which it belongs, the nodes that bound this mesh and the components of these nodes in the source space are identified, which are found in the rows of the look-up table; to this mesh of the source space there corresponds a mesh of the destination space, nodes that bound this mesh and components of these nodes in the destination space that are found in the same rows of the look-up table; starting from the position of the end of the source colour vector in the mesh of the source space, the position of the end of this vector in the corresponding mesh of the destination space can be deduced by interpolation, and since, thanks to the look-up table, the components of the nodes of this mesh expressed in the destination space are known, the components of the colour vector in this destination space are finally deduced; thus the values of the components of the destination colour vector sought are now able to be interpolated. It should be noted that the determination of the position of the end of the source vector in the mesh amounts to comparing the values of the components of the source colour vector to be converted with the values of the components of the colour vectors Which correspond to the nodes, expressed in the source space.

The documents U.S. Pat. Nos. 5,786,908, 6,034,667, 6,781,596, EP1223765 and US2005/128497 describe such methods based on look-up tables (LUT) and various interpolation algorithms, for example: tri-linear interpolation where each mesh comprises eight nodes, tetrahedral interpolation where each mesh comprises four nodes, prismatic interpolation where each mesh comprises six nodes.

Such conversions from one colour space to another require time and processing means that are sometimes too weighty for practical use. Indeed, colour spaces are generally at least three-dimensional, which makes the interpolation operations particularly complex.

In the case where the source and destination colour spaces each have a component correlated to the luminance, the other components then being chromatic components, the documents U.S. Pat. Nos. 5,650,942, 6,335,800 and EP1011263 teach that the .conventional three-dimensional interpolation operation is decomposed into a two-dimensional interpolation operation on the chromatic components and a scalar interpolation operation (one-dimensional space) on the component correlated to the luminance; each interpolation operation uses its own look-up table.

Such a decomposition advantageously allows the conversion calculations to be simplified and accelerated, notably because simpler look-up tables can be used. In practice, starting from any given source colour space, it is possible to perform, by a simple linear operation, a preliminary conversion towards another source colour space one component of which is correlated to the luminance, the other components then being chromatic components; thus, it is very easy to go from the space XYZ to the space xyY, where x=X/(X+Y+Z) and y=Y/(X+Y+Z), Y representing the luminance and x and y the tri-chromatic components; the reverse is true for the destination space. Consequently, the two-step interpolation method can be used for conversions between any given colour spaces, with the caveat of adding a preliminary linear conversion step between source colour spaces and/or a final linear conversion step between destination colour spaces.

One goal of the invention is to further improve the space conversion process described in the documents U.S. Pat. Nos. 5,650,942, 6,335,800 and EP1011263.

SUMMARY OF THE INVENTION

For this purpose, the invention relates to a method for converting the n components $x_S$, $y_S$, $S_S$ of a colour vector expressed in an n-dimensional source colour space into m components $R_D$, $G_D$, $\Sigma_D$ of this same vector expressed in an m-dimensional destination colour space, the said n components comprising a source luminance component $S_S$ and n-1 source chromatic components $x_S$, $y_S$, the said m components also comprising a destination luminance component $\Sigma_D$ and m-1 destination chromatic components $R_D$, $G_D$, the said method comprising:
- a first operation in which, starting only from the said chromatic components $x_S$, $y_S$ of the colour vector to be converted expressed in the source colour space, the components of an intermediate colour vector in the destination colour space $R_{INT\text{-}CR}$, $G_{INT\text{-}CR}$, $\Sigma_{INT\text{-}CR}$ are interpolated,
- a second operation in which, starting only with the luminance component $S_S$ of the colour vector to be converted expressed in the source colour space and from the luminance component $\Sigma_{INT\text{-}CR}$ of the intermediate colour vector expressed in the destination colour space, the luminance component $\Sigma_D$ of this colour vector to be converted is interpolated in the destination colour space, and
- a third operation in which the chromatic components $R_D$, $G_D$ of this colour vector expressed in the destination colour space are calculated starting from its luminance component $\Sigma_D$ and the components of the intermediate colour vector $R_{INT\text{-}CR}$, $G_{INT\text{-}CR}$, $\Sigma_{INT\text{-}CR}$ expressed in the destination colour space. The conversion methods of the prior art, notably those described in the documents U.S. Pat. Nos. 5,650,942, 6,335,800 and EP1011263, are substantially improved.

More precisely, according to the invention, for the interpolation operation of the second operation, a normalized luminance look-up table is used comprising a plurality of pairs $S_{S\text{-}N}$, $\Sigma_{D\text{-}N}$ of values comprising a normalized luminance component $S_{S\text{-}N}$ in the source colour space and a normalized luminance component $\Sigma_{D\text{-}N}$ in the destination colour space.

Preferably, in order to go from a luminance component in the source space $S_S$ or in the destination space $\Sigma_D$ of the colour vector to be converted to a normalized luminance component in the source space $S_{S\text{-}N}$ or in the destination space $\Sigma_{D\text{-}N}$ of the same colour vector, the following equations are used:

$$S_{S-N} = \frac{S_S}{S_{INT-CR}} \text{ and } \Sigma_{D-N} = \frac{\Sigma_D}{\Sigma_{INT-CR}},$$

where $S_{INT\text{-}CR}$ is the luminance component of the said intermediate colour vector in the source space.

Preferably, in the source colour space, the chromatic components $X_{INT\text{-}CR}$, $Y_{INT\text{-}CR}$ of the intermediate vector are equal to the chromatic components $x_S$, $y_S$ of the vector to be converted.

Preferably, for the interpolation operation of the first operation, a chromatic look-up table is used that comprises a plurality of multiplets $x_{S\text{-}Ci}$, $y_{S\text{-}Ci}$, $S_{S\text{-}Ci}$, $R_{D\text{-}Ci}$, $G_{D\text{-}Ci}$, $\Sigma_{D\text{-}Ci}$ with n+m values comprising the n components $X_{s\text{-}Ci}$, $y_{S\text{-}Ci}$, $S_{S\text{-}Ci}$ that define a conversion colour vector in the source colour space and the m components $R_{D\text{-}Ci}$, $G_{D\text{-}Ci}$, $\Sigma_{D\text{-}Ci}$ that define this same conversion colour vector in the destination colour space. Advantageously, the ends of these colour vectors whose components appear in this look-up table form the nodes of a mesh of the source space and/or of a mesh of the destination space; preferably, this mesh is used for the interpolation operation.

According to a first variant, the source space is a calorimetric space independent of any device, and the destination space is a space dependent on a device, such as for example an image display device. As calorimetric space independent of any device a space derived from the CIE space XYZ is preferably chosen.

According to a second variant, the destination space is a calorimetric space independent of any device, and the source space is a space dependent on a device, such as for example an image capture device. As calorimetric space independent of any device a space derived from the CIE space XYZ is preferably chosen.

BRIEF DESCRIPTION OF THE DRAWINGS

The invention will be better understood upon reading the description that follows, presented by way of non-limiting example and with reference to the appended figures, in which.

BRIEF DESCRIPTION OF THE PREFERRED EMBODIMENTS

Figure 1:
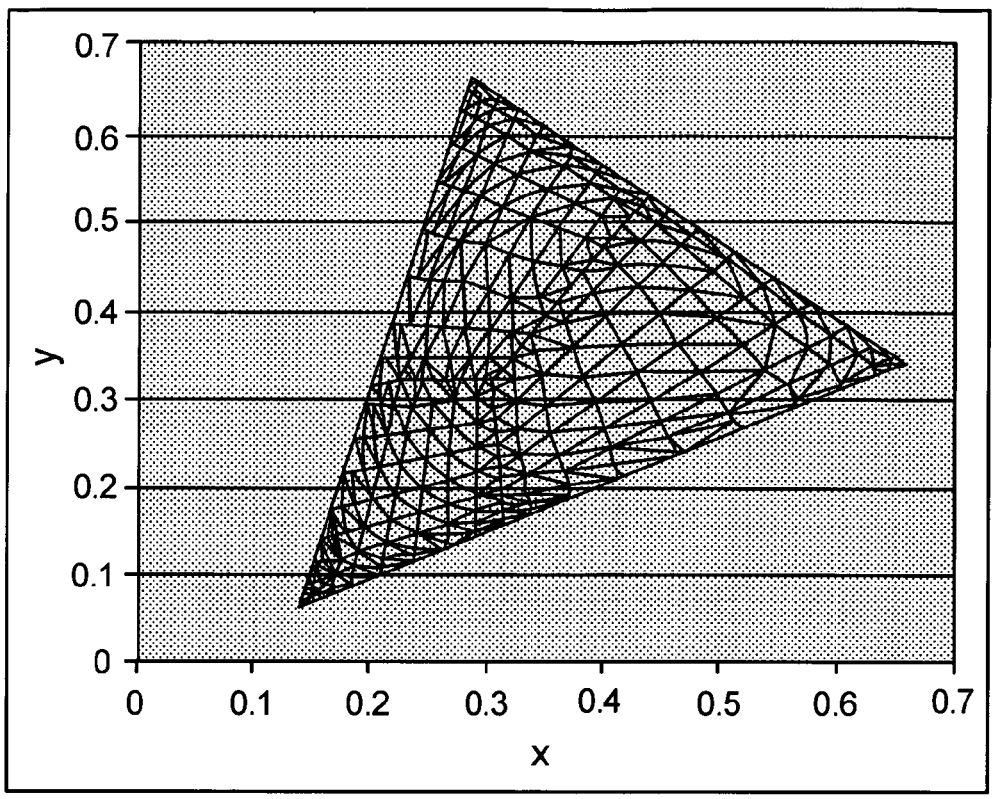
FIG. 1 gives an example of two-dimensional mesh of the chromatic sub-space of the source space for one embodiment of the invention.

An embodiment of the method according to the invention will now be described that may be applied to the control of a tri-chromatic image display device; the starting point is therefore from a CIE colour space XYZ that is independent of any device in which each pixel of an image to be displayed is represented by a colour vector comprising three components X, Y and Z. The object of the method according to the invention is to express this vector in another colour space, conventionally denoted RGB, which is associated with the image display device in such a manner that the three components of each colour vector of this space correspond to three control signals for this device capable of displaying the said colour.

A first step of the conversion method consists in going from the colour space XYZ to the derivative space xyS which separates more precisely the two chromatic components x and y from a component correlated to the luminance S. This conversion is carried in a manner known per se by a simple linear operation according to the equations: S=X+Y+Z, x=X/S and y=Y/S. In parallel, in the destination space, a component correlated to the luminance is identified, which is defined for example as follows: Σ=R+G+B.

The following steps of the method therefore relate to the passage from the colour space referred to as source space xyS to the colour space referred to as destination space RBΣ.

In order to implement the method according to the invention, the starting point is the assumption that the conversion of the colour vectors takes place at constant proportion of colours; two simplified look-up tables can therefore be used:

one chromatic look-up table, three-dimensional, where each row gives the three components R, G, Σ of a vector of the destination space and the three components x, y, S of the vector corresponding to the source space;

one luminance look-up table, allowing the variations from the component Σ correlated to the luminance in the destination space to the component S, also correlated to the luminance, in the source space to be determined.

The ends of the colour vectors of the chromatic look-up table are for example distributed uniformly in the destination space according to a homogeneous cubic mesh in the RGB space: if the values of the components are encoded over 10 bits (0 to 1023), the side of the elementary cubic mesh is for example equal to 93; each cubic mesh comprises eight corners which are the meshing nodes of this space; the entire space therefore comprises 10×10 elementary cubic meshes; the maximum values of R, G and B are then 930.

As illustrated by Table 1, which is an extract from the chromatic look-up table used, each row of this table therefore comprises six columns: the first three, x, y et S respectively, are the components of a conversion colour vector in the source space, whose end forms a meshing node of this space, and the last three, R, G and Σ respectively, are the components of the same conversion colour vector in the destination space whose end also forms a meshing node of this space. In practice, in order to obtain this table, in a manner known per se, each triplet R, G, B (where B=Σ-R-G) is used as input signal of the display device, and the components X, Y, and Z of the image thus displayed by the device are measured, from which the triplet x, y, S is deduced.

To the homogeneous cubic meshing in the destination space, there then corresponds a two-dimensional mesh in the sub-space of the chromatic components x, y of the source space, as is shown in FIG. 1.

TABLE 1

Extract from the chromatic look-up table

| X | y | S | R | G | Σ |
|---|---|---|---|---|---|
| 0.159 | 0.064 | 62.92 | 0 | 0 | 930 |
| 0.158 | 0.063 | 64.00 | 0 | 93 | 1023 |
| 0.256 | 0.659 | 47.49 | 0 | 930 | 930 |
| 0.252 | 0.667 | 47.14 | 0 | 930 | 1023 |
| 0.240 | 0.649 | 48.86 | 0 | 930 | 1302 |
| 0.158 | 0.063 | 63.29 | 93 | 0 | 1023 |
| 0.158 | 0.065 | 64.58 | 93 | 186 | 1209 |
| 0.255 | 0.671 | 46.60 | 93 | 930 | 1023 |
| 0.158 | 0.063 | 64.13 | 186 | 0 | 1116 |
| 0.249 | 0.676 | 46.79 | 186 | 930 | 1395 |
| 0.163 | 0.065 | 64.51 | 279 | 0 | 1209 |
| 0.162 | 0.065 | 64.39 | 279 | 93 | 1302 |
| 0.165 | 0.068 | 64.91 | 279 | 186 | 1395 |
| 0.166 | 0.077 | 67.16 | 279 | 279 | 1488 |
| 0.175 | 0.073 | 66.30 | 372 | 186 | 1488 |
| 0.257 | 0.136 | 76.44 | 651 | 372 | 1953 |
| 0.293 | 0.128 | 75.75 | 744 | 0 | 1674 |
| 0.294 | 0.137 | 77.28 | 744 | 279 | 1953 |
| 0.627 | 0.290 | 29.54 | 930 | 0 | 930 |
| 0.624 | 0.286 | 30.05 | 930 | 0 | 1023 |
| 0.631 | 0.289 | 29.60 | 930 | 0 | 1116 |
| 0.631 | 0.290 | 30.09 | 930 | 0 | 1209 |
| 0.404 | 0.181 | 72.96 | 930 | 0 | 1767 |
| 0.609 | 0.283 | 32.35 | 930 | 186 | 1488 |
| 0.440 | 0.202 | 59.34 | 930 | 186 | 1860 |
| 0.381 | 0.176 | 86.34 | 930 | 232 | 2092 |
| 0.599 | 0.303 | 32.18 | 930 | 279 | 1209 |
| 0.426 | 0.224 | 64.82 | 930 | 372 | 2046 |

Figure 2:
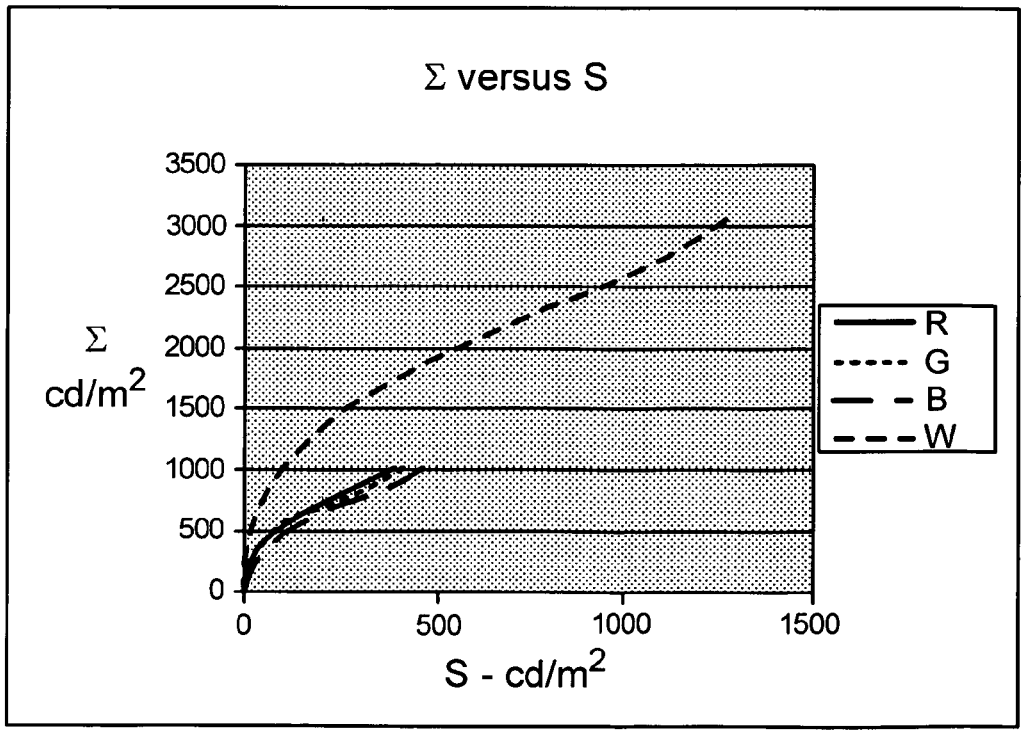
FIG. 2 illustrates, before normalization, an example of one-dimensional conversion of the luminance components of the source space towards the destination space, for the embodiment in FIG. 1.
Figure 3:
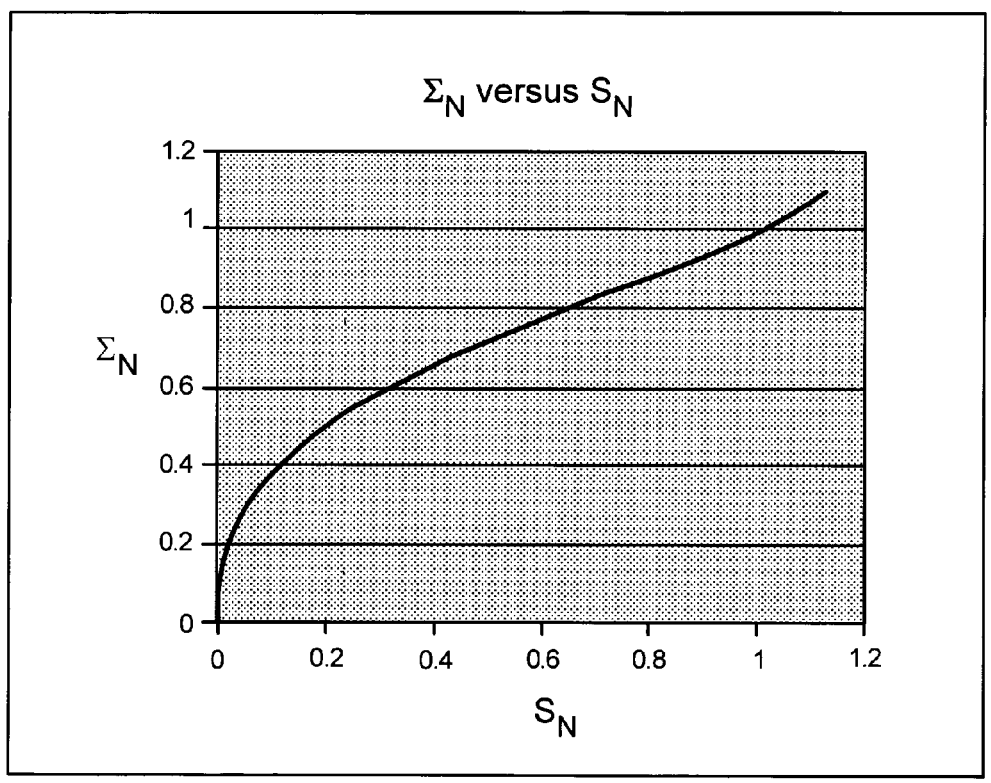
FIG. 3 illustrates the same example of conversion as in FIG. 2, but after normalization of the luminance components.

The ends of the colour vectors of the luminance look-up table are for example distributed, in the destination space, over the following axes: the achromatic axis W, or 'grey' axis, for which R=G=B, which is therefore the diagonal of the cube RGB, and the three respective axes red R, green G and blue B; the one-dimensional meshing nodes are distributed for example uniformly along these axes for example in increments of 11 between the value 0 and the value 1023. On each axis, each mesh therefore corresponds to an interval of values of S on this axis. This look-up table-only comprises two columns: the first gives the value S of the component correlated to the luminance of a colour vector in the source space, and the second gives the value Σ of the component correlated to the luminance of the same colour vector in the destination space. In practice, in a manner known per se, the previously defined values of R, G, B (where B=Σ-R-G) of the one-dimensional mesh nodes of the white, red, green and blue axes are used as input signal of the display device, and the components X, Y, and Z of the image thus displayed by the device are measured, from which the value of S is deduced. FIG. 2 illustrates this luminance look-up table in the form of 'Σ versus S' curves regrouping the mesh points or nodes for the white, red, green and blue axes, respectively. By dividing, on each axis, the values of Σ and of S by the respective maxima of Σ and S on this axis, a normalized luminance look-up table is then obtained, which comprises pairs of normalized values $\Sigma_N$, $S_N$; the four curves illustrating (as before) this normalized table for each of the axes are then observed to coincide; this single curve is shown in FIG. 3, with a normalization factor that also takes into account a maximum reference level, here the level 930, of the two-dimensional mesh in FIG. 1. If the following are defined:

$$\Sigma_{NORM}=(Max(\Sigma).930)/1023; S_{NORM}=(Max(S).930)/1023;$$

then $$\Sigma_N = \frac{\Sigma}{\Sigma_{NORM}} \quad S_N = \frac{S}{S_{NORM}}$$

The chromatic look-up table and the normalized luminance look-up table thus being obtained, the conversion method according to the invention may be applied in the following manner.

The components of the 'black' colour vector in the source space are furthermore evaluated, for example by measurement of these components ($x_K$, $y_K$, $S_K$) while applying to the display device input signals of zero value ($R_K=G_K=B_K=0$).

Any given colour vector is taken expressed, in the source colour space, by its chromatic components and by its component correlated to the luminance.

A preliminary operation of the method consists in subtracting the 'black' colour vector from the colour vector to be converted. The chromatic component values $x_S$ and $y_S$ and the component value $S_S$ correlated to the luminance are obtained. The values $R_D$, $G_D$, $B_D$ and $\Sigma_D=R_D+G_D+B_D$ of the components of the colour vector in the destination RGB space are therefore sought.

Figure 4:
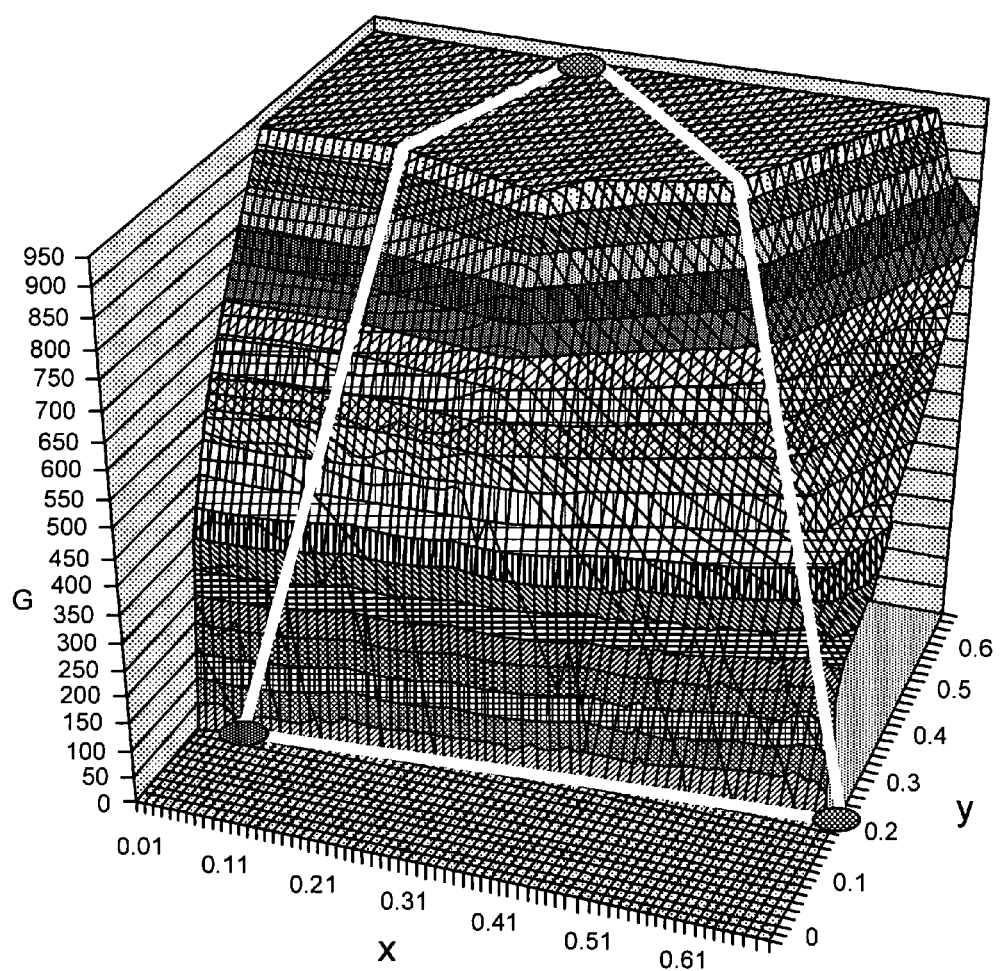
FIG. 4 gives an example of surface used for the interpolation of a chromatic component of an intermediate colour vector within a mesh in FIG. 1.

The first true operation of the method consists of an interpolation in the chromatic sub-space of the source space: in this two-dimensional space which is meshed as shown in FIG. 1, the mesh is pinpointed to which the chromatic point corresponding to the values $x_S$ et $y_S$ belongs; the nodes that bound this mesh correspond to rows of the chromatic look-up table which give values of conversion colour vector components both in the source space and in the destination space; starting from these values, and the values of $x_S$ and $y_S$, but without using, at this stage, the value of the luminance component $S_S$, intermediate chromatic interpolation values $S_{INT-CR}$, $R_{INT-CR}$, $G_{INT-CR}$, $\Sigma_{INT-CR}$ are deduced by interpolation; it should be noted that the colour vector referred to as 'intermediate' with components $x_S$, $y_S$, $S_{INT-CR}$ is generally different from the colour vector to be converted $x_S$, $y_S$, $S_S$. FIG. 4 gives an example of surface usable for an interpolation, here linear, of $G_{INT-CR}$ (G in the figure) as a function of the values of $x_S$ and $y_S$ (see axes x and y in the figure) which may be represented by a point included in the triangular mesh bounded by the white lines; for this example, the values of the component G at the three nodes of the triangular mesh are: for the $1^{st}$ node, x=0.013, y=0.130 and G=0; for the $2^{nd}$ node x=0.710, y=0.200 and G=0; for the $3^{rd}$ node, x=0.213, y=0.600 and G=950.

In the case where the chromatic point corresponding to the values $x_S$ and $y_S$ were situated outside of the mesh of the chromatic sub-space of the source space, colour mapping methods, which are known per se and which will not be described here in detail, could be employed; a well-known method called 'clipping' consists for example in projecting the point onto one side of the nearest mesh.

As a preliminary step to the third step of the method, the normalized luminance component is calculated:

$$S_{S-N} = \frac{S_S}{S_{INT-CR}}.$$

The second operation of the method consists of an interpolation in the sub-space of normalized luminance of the source space: in this space with a single dimension which is meshed along a single curve shown in FIG. 3, the interval is pinpointed to which the value $S_{S-N}$ of the normalized luminance component in the source space belongs and, by one-dimensional interpolation, the value $\Sigma_{D-N}$ of the normalized luminance component in the destination space is deduced. As a variant, for this interpolation, an algebraic function representative of the curve '$\Sigma$ versus S' may be used.

The third operation of the method is a mathematical calculation that gives the values sought $R_D$, $G_D$, and $\Sigma_D$ of the components of the colour vector in the destination RG$\Sigma$ space. This is given by:

$$R_D = R_{INT-CR} \cdot \Sigma_{D-N} \quad G_D = G_{INT-CR} \cdot \Sigma_{D-N} \quad \Sigma_D = \Sigma_{INT-CR} \cdot \Sigma_{D-N}$$

Since the components of the 'black' colour vector are all zero in the destination space, no correction is to be applied here to the values of the components obtained $R_D$, $G_D$, and $\Sigma_D$.

For the control of the display device, the values of $R_D$, $G_D$ and $B_D$ are needed; the value of $B_D$ is deduced by the equation: $B_D = \Sigma_D - R_D - G_D$.

In summary, the method essentially comprises:
a first operation in which, starting only from the chromatic components $x_S$, $y_S$ of a colour vector to be converted expressed in the source colour space, the components of an intermediate colour vector in the destination colour space $R_{INT-CR}$, $G_{INT-CR}$, $\Sigma_{INT-CR}$ are interpolated, whose components expressed in the source colour space are: $x_{INT-CR} = x_S$, $y_{INT-CR} = y_S$, and $S_{INT-CR}$;
a second operation, after the first, in which, starting only from the luminance component $S_S$ of the colour vector to be converted expressed in the source colour space and from the luminance component $\Sigma_{INT-CR}$ of the intermediate colour vector expressed in the destination colour space, the luminance component $\Sigma_D$ of the vector to be converted is interpolated, in the destination colour space, by means, here, of the normalization of the luminance sub-spaces of the source space and of the destination space: if $S_{S-N}$ is the normalized component in the source space, the normalized component $\Sigma_{D-N}$ in the destination space is extrapolated from $S_{S-N}$, and finally $\Sigma_D = \Sigma_{INT-CR} \cdot \Sigma_{D-N}$ is deduced; and
a third operation in which the chromatic components $R_D$, $G_D$ of the colour vector expressed in the destination colour space are calculated from its luminance component $\Sigma_D$ and from the components of the intermediate colour vector $R_{INT-CR}$, $G_{INT-CR}$, $\Sigma_{INT-CR}$ expressed in the destination colour space; this is given by: $R_D = R_{INT-CR} \cdot \Sigma_{D-N}$ $G_D = G_{INT-CR} \cdot \Sigma_{D-N}$, where $$\Sigma_{D-N} = \frac{\Sigma_D}{\Sigma_{INT-CR}}.$$

The same method, but the reverse of what has just been described, can be used to go from the RGB space associated with the display device or with a capture device to the XYZ space, independent of this device.

The invention is especially applicable to the cases where no linear relationship exists between the source space and the destination space, notably to image display devices that comprise three primary colours. The invention may thus be applied to cathode-ray tube devices, to plasma display screens, to LCD screens, to projectors with a single or with three micro-imagers, of the type using liquid crystals or micromirrors. The invention is especially applicable to high-dynamic-range devices that comprise a dual modulation stage, at least for the luminance, such as for example LCD screens backlit by a modulatable LED matrix.

The invention may also be applied to:
conversions between colour spaces with more than three dimensions, as long as one of the dimensions may be correlated to the luminance, in which case by simple linear transformation as previously described;
conversions between a colour space associated with an image capture device and another colour space, notably a colour space for the transmission of images.

The invention claimed is:

1. Method for converting the n components ($x_S$, $y_S$, $S_S$) of a colour vector expressed in an n-dimensional source colour space into m components ($R_D$, $G_D$, $\Sigma_D$) of this same vector expressed in an m-dimensional destination colour space, the said n components comprising a source luminance component ($S_S$) and (n-1) source chromatic components ($x_S$, $y_S$), the said m components also comprising a destination luminance component ($\Sigma_D$) and (m-1) destination chromatic components ($R_D$, $G_D$),
the said method comprising the following steps :
finding an intermediate colour vector having, in the source color space, approximately the same chromatic components ($x_{INT-CR} = x_S$, $y_{INT-CR} = y_S$) as those ($x_S$, $y_S$) of said colour vector to be converted and a given luminance component ($S_{INT-CR}$),
interpolating the components ($R_{INT-CR}$, $G_{INT-CR}$, $\Sigma_{INT-CR}$) of this intermediate colour vector in the destination colour space,
interpolating the luminance component ($\Sigma_D$) of this colour vector expressed in the destination colour space by using a normalized luminance look-up table comprising a plurality of pairs ($S_{S-N}$, $\Sigma_{D-N}$) of values, where each pair comprises a normalized luminance component $$S_{S-N} = \frac{S_S}{S_{INT-CR}}$$

in the source colour space and a normalized luminance component $$\Sigma_{D-N} = \frac{\Sigma_D}{\Sigma_{INT-CR}}$$

in the destination colour space, and
calculating the chromatic components ($R_D$, $G_D$) of the said colour vector expressed in the destination colour space by using the formula $R_D = R_{INT-CR} \cdot \Sigma_{D-N}$  $G_D = G_{INT-CR} \cdot \Sigma_{D-N}$; and wherein, all of the method steps are performed by a processor on a display device.

2. Method according to claim 1, wherein, for the finding of the intermediate coulour vector and the interpolation of its components in the destination color space, a chromatic look-up table is used that comprises a plurality of multiplets ($x_{S-Ci}$, $Y_{S-Ci}$, $S_{S-Ci}$, $R_{D-Ci}$, $G_{D-Ci}$, $\Sigma_{D-Ci}$) with (n+m) values comprising the n components ($x_{S-Ci}$, $y_{S-Ci}$, $S_{S-Ci}$) that define a conversion colour vector in the source colour space and the m components ($R_{D-Ci}$, $G_{D-Ci}$, $\Sigma_{D-Ci}$) that define this same conversion colour vector in the destination colour space.

3. Method according to claim 1, where the source space is a colorimetric space independent of any device, and where the destination space is a space dependent on a device.

4. Method according to claim 1, where the destination space is a colorimetric space independent of any device, and where the source space is a space dependent on a device.

* * * * *